US 6,681,948 B1

(12) United States Patent
Santa Cruz et al.

(10) Patent No.: US 6,681,948 B1
(45) Date of Patent: Jan. 27, 2004

(54) PROTECTIVE COVER PLATE FOR TEMPORARILY COVERING AN ELECTRICAL OUTLET BOX

(76) Inventors: Cathy D. Santa Cruz, 7630 Tholl Dr., Reno, NV (US) 89506; David M. Bates, P.O. Box 2108, Portola, CA (US) 96122

( * ) Notice: Subject to any disclaimer, the term of this patent is extended or adjusted under 35 U.S.C. 154(b) by 0 days.

(21) Appl. No.: 10/295,287

(22) Filed: Nov. 14, 2002

(51) Int. Cl.$^7$ .............. H02G 3/08; B65D 51/00
(52) U.S. Cl. .............. 220/3.8; 220/230; 220/243; 220/281; 174/66
(58) Field of Search .............. 220/230, 3.8, 4.02, 220/243, 281; 229/122; 174/66, 67

(56) References Cited

U.S. PATENT DOCUMENTS

| | | | | |
|---|---|---|---|---|
| 3,059,803 A | * | 10/1962 | Holsinger ............. | 220/3.4 |
| 3,408,234 A | * | 10/1968 | Ririe, Jr. ............. | 429/120 |
| 3,831,837 A | * | 8/1974 | Finger et al. ......... | 229/123.2 |
| 4,427,705 A | * | 1/1984 | Wyslotsky et al. ..... | 426/106 |
| 4,521,997 A | * | 6/1985 | Tiberend ............. | 52/3 |
| 4,726,159 A | * | 2/1988 | Stohs ................ | 52/99 |
| 5,048,707 A | * | 9/1991 | Hallberg ............. | 220/4.21 |
| 5,178,350 A | * | 1/1993 | Vink et al. .......... | 248/27.1 |
| 5,562,222 A | | 10/1996 | Jordan et al. ........ | 220/3.8 |
| 5,746,340 A | * | 5/1998 | Kearfott et al. ...... | 220/3.8 |
| 5,902,960 A | | 5/1999 | Smith ................ | 174/66 |
| 6,076,696 A | * | 6/2000 | Neuman .............. | 220/230 |
| 6,079,617 A | * | 6/2000 | Kim .................. | 229/122 |
| 6,260,729 B1 | * | 7/2001 | Mitchell et al. ...... | 220/287 |

* cited by examiner

Primary Examiner—Joseph Man-Fu Moy

(57) ABSTRACT

Herein taught is a novel protective cover plate for temporarily covering a prior art electrical outlet box during the construction process so as to protect the electrical outlet box from contaminants, such as plaster, joint compound, or the like. The cover plate is formed from any suitable material that can be corrugated so as to form ridges and grooves. This arrangement provides unusual results as it provides a natural finger grip and it allows the cover plate to be easily adapted or modified on site so as to be useable with substantially any type, style or various size of electrical outlet box.

5 Claims, 1 Drawing Sheet

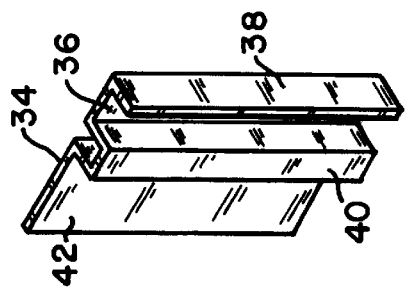
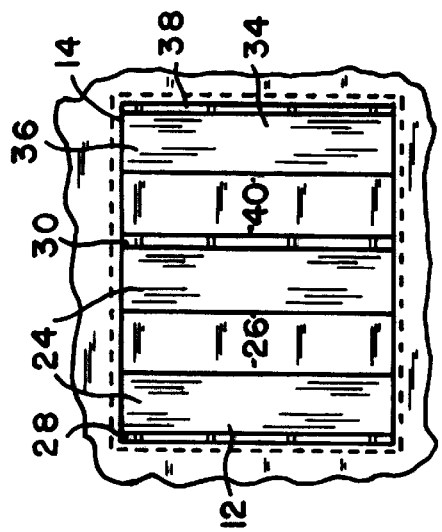
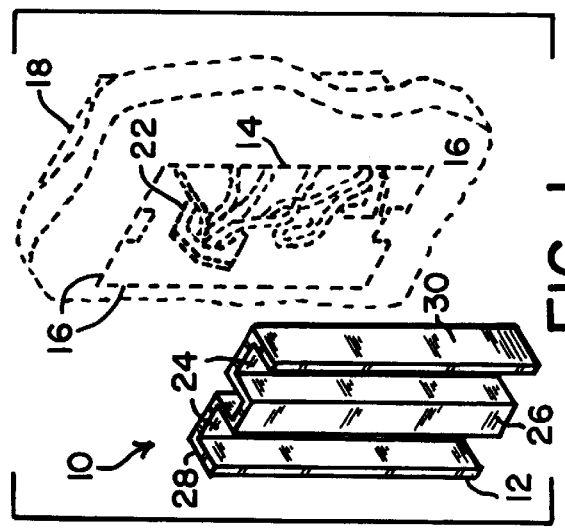
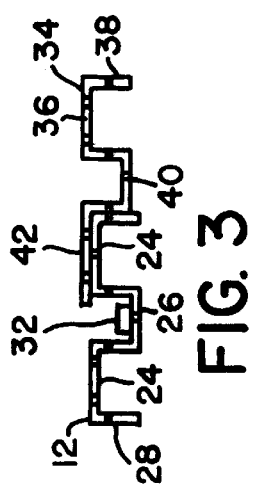

PROTECTIVE COVER PLATE FOR TEMPORARILY COVERING AN ELECTRICAL OUTLET BOX

FIELD OF THE INVENTION

This invention relates in general to cover plates that are typically associated with electrical outlet boxes but more particularly pertains to a protective cover plate that is only used to protect the electrical outlet box during the finishing stages while constructing a wall, or the like. The cover plate is universal, whereby usable with any style or specialized brand of the known typical electrical outlet boxes that are currently available. Also, the present cover plate is functional as one unit, or multiples of the cover plate may be used in unison so as to be adaptable with electrical boxes of various sizes.

BACKGROUND OF THE INVENTION

It is well known within the construction field, that when building residential and commercial buildings various workers must perform many tasks simultaneously. Thus, time is often a critical factor, as well as efficiency and productivity. For example, electrical work in the nature of installing electrical wires, fuse boxes and the like is done prior to putting up interior walls, installing sheet rock, painting and such. When the electrician finishes the first phase of the work, typically wires remain exposed and uncovered within the open electrical junction boxes. After the walls are put up, however, the electrician still must follow behind and complete the wiring to switches, appliances, lighting and so forth. It is desirable to keep the time spent on this second phase to a minimum.

However a problem exists, as the electrical wires often accidentally get cut, painted over, plastered over, or otherwise damaged by co-workers while installing the walls around and/or over the junction boxes. When this is the case, the electrician must spend extra time in repairing or cleaning the wires prior to proceeding with the final phase of installation. This is most unfortunate as this inhibits the electrician's efficiency and inadvertently increases construction costs.

In the past many attempts have been made to remedy the situation. For example, workers may install a screwed on face plate, or they may crumple up paper wads to stuff in the junction box housing, etc. Unfortunately, these remedies are involved and are also very time consuming and thus do not resolve the problem in any manner.

Therefore, it is desirable to provide a means to protect the electrical outlet boxes during the construction phase in a manner that is efficient, quick, easy and inexpensive. An example of similar known prior art is taught in U.S. Pat. No. 5,562,222 entitled "TEMPORARY COVER FOR ELECTRICAL OUTLET BOXES" issued to: Jordan et al on Oct. $8^{th}$ 1996. Wherein taught is a disposable cover of the type described which is formed from a very thin sheet of flat material having an inwardly extending flange which is sized to frictionally engage the inner surfaces of the walls of the outlet box. The cover is of the press fit variety and is used to temporarily protect the electrical components within the outlet box during construction, such as taught by the present invention. However, it can clearly be seen that this type of temporary cover has inherent disadvantages that the present invention recognizes, addresses and resolves in a manner heretofore not taught, as will be seen within the following specification.

For example, the noted reference is formed as a flat plastic plate having an exterior flange and two opposing indents for attaching the plate onto the electrical box and a finger grip for removal thereof. This is useful for its intended purpose for attaching and removing the plate but this causes additional problems. For example, the finger grip and indents within the plate can easily be filled or compacted with plaster or the like, just as easily as the electrical outlet box itself, thus defeating the entire purpose of the plate. Also, this type of plate does not provide any means for easily locating the plate and/or electrical box after the wall or sheetrock has been installed, this is important and is a novel advantage taught within the present invention. Still further the noted reference does not provide a cover plate that can be used in multiples so as to be usable with electrical outlet boxes having multiple outlets therein and/or various widths. Therefore, this type of flat electrical protective plate is not desirable and has not been found to be useful within today's construction field.

OBJECTS AND ADVANTAGES OF THE PRESENT INVENTION

It is therefore an object of the present invention to provide a protective cover plate for temporarily covering an electrical outlet box that is of simple construction and economical to manufacture. For example, the plate may be formed from of material which can be corrugated, respectively. Whereby, the protective cover plate is formed having prominent ridges and grooves, each of which serve a purpose and provide unusual results not associated within the prior art, as later described.

Yet another object of the present invention is to provide a protective cover plate for temporarily covering an electrical outlet box that resolves the problems normally associated with the typical cover plates that are available in the construction field today.

Still another object of the present invention is to provide a protective cover plate for temporarily covering an electrical outlet box that eliminates the need for any attachment means, such as nails, screws, bolts or nuts, etc.

Also another object of the present invention is to provide a protective cover plate for temporarily covering an electrical outlet box that can be used several times, and/or after use may be easily discarded and/or recycled in a manner which is economically friendly, unlike plastic or other materials which are not. Although it is to be noted that the plate may be made from substantially any material of engineering choice, including metal, wood, plastic, rubber, cardboard, aluminum, etc., if so desired.

Yet a further object of the present invention is to provide a protective cover plate for temporarily covering an electrical outlet box that can be used in multiples. Whereby allowing a workman to easily install multiple covers in a side-by-side relationship so as to be functional with electrical outlet boxes having multiple electrical outlet plugs therein, such as 4, 6, or 8, etc.

Still another object of the present invention is to provide a protective cover plate for temporarily covering an electrical outlet box that may include optional locator means thereon. For example, the plate may include a centralized magnet which allows a user to easily locate the plate as well as the outlet box after the wall or sheetrock has been erected by use of a magnet of proper polarity. Also, if the magnet is not used the cover plate and electrical outlet box may also be easily detected by use of a metal detector if so desired, which is most advantageous.

Other objects and advantages will be seen when taken into consideration with the following drawings and specification.

BRIEF DESCRIPTION OF THE DRAWINGS

FIG. 1 is substantially a perspective plan view for the protective cover plate of the present invention.

FIG. 2 is substantially a perspective view of an optional extension means for extending the width of the protective cover plate of FIG. 1, with the optional extension means being in the form of a second cover plate.

FIG. 3 is substantially a top view of the above noted cover plates when used in combination.

FIG. 4 is substantially a front view of the above noted cover plates when installed in a prior art electrical outlet box which is of a size other than standard.

DETAILED DESCRIPTION OF THE DRAWINGS

Referring now in detail to the drawings wherein like characters refer to like elements throughout the various drawings. As depicted in FIG. 1, we show an overview (10) of the preferred embodiment for the present invention, which is a protective cover plate (12), for temporarily covering a typical standard sized prior art electrical outlet box (14). It is to be understood any standard type of electrical outlet box is suitable for use with the present invention and thus the invention is not to be limited to any specific type or brand. For example, any type of electrical outlet box which is constructed form four panels (16) and a rear panel (18) which when interconnected form a housing having an internal compartment (20) for containment of electrical components (22) and an open front, is suitable for use with the present invention.

Referring now to protective cover plate (12), which is substantially a sheet of material which is shaped to form interconnected corrugations, with the corrugations including at least two groves (24) that are separated by at least one ridge (26). One of the grooves (24) providing a first upraised side-wall (28), and the other one of grooves (24) providing a second upraised side-wall (30). Thus, the first upraised side-wall (28) is substantially distanced or separated by ridge (26) and opposed to second upraised side-wall (30) respectively.

It can now be seen that protective cover plate (12), or more specifically the sheet of material that is shaped to form interconnected corrugations is clearly of a shape and size to be frictionally removably engaged within internal compartment (20) and temporarily shields the internal electrical components (22) in an efficient quick manner.

It can further be seen that when the protective cover plate (12) is installed within internal compartment (20) each side wall (28 & 30) and ridge (26) have substantially a flush relationship with the open front of the prior art electrical box (14), respectively. This is important as the cover plate (12) will not protrude there from and/or interfere with workers.

Also, it can clearly be seen that the referenced at least one ridge (26) is very useful and important as it functions as a finger grip for easily removing the protective cover plate (12), or more specifically the sheet of material that is shaped to form interconnected corrugations from within internal compartment (20) after it has served its purpose and is no longer needed.

It is to be noted, we further provide novel means for locating the protective cover plate (12) after it has been covered by sheetrock, wallboard, or the like, such as a magnet (32), "only depicted in FIG. 3". It is to be understood any type, size or shape of magnet may be used, depending on engineering choice. Also, the magnet (32) may be positioned at any location of choice and it may be attached by any suitable attachment means. For example, magnet (32) as depicted herein is magnetically attached and is centrally positioned, respectively. However, if the protective cover plate (12) is made from a material other than metal, the magnet (32) can be easily glued, adhesively applied, or simply taped, etc. Whereby, a worker can use another magnet (not shown) of proper polarity to centrally locate the protective cover plate (12) as well as the prior art electrical outlet box (14) in a quick and efficient manner. However, if preferred a worker may alternately use a metal detector (not shown) which is also efficient.

It is to be further understood the protective cover plate (12) may be made from any suitable material of engineering choice, such as metal, wood, plastic, rubber, cardboard, aluminum, or the like. Also, cover plate (12) may be of any suitable size, for example it may measure the same or slightly smaller than a standard prior art electrical box, such as 2 inches by 3½ inches, 2 inches by 4½, 2 inches by 6½, or 2 inches by 8½ inches, etc. However, rather than provide various sizes it is preferable to provide simplified means to somewhat modify protective cover plate (12) so as to be usable with electrical outlet boxes of various sizes, such as follows.

Referring now to FIGS. 3, 4 & 5 wherein we teach a novel optional extension means for extending the width of protective cover plate (12). This is important as typical prior art electrical boxes are produced in many different sizes. Therefore, we now provide an optional extension means substantially comprising of a second cover plate (34), which is formed from a sheet of material that is shaped to form interconnected corrugations, with the last noted corrugations including at least one groove (36) that is formed in between an upraised side-wall (38) and one upraised ridge (40) and upraised ridge (40) is shaped to substantially form an L-shaped ledge (42). Thus it can be seen upraised side-wall (38) is distanced or separated and opposed to L-shaped ledge (42), and L-shaped ledge (42) is of a shape and size to receive and mate with either first upraised side-wall (28) or second upraised sidewall (30) of protective cover plate (12), as clearly depicted in FIGS. 3 & 4.

Whereby the protective cover plate (12) and second cover plate (34) when used in combination, allow a worker to easily adjust the width of protective cover plate (12) so as to be adaptable for use with any prior art electrical outlet box which is of a size other than standard.

It is to be understood that either the first or second upraised side-wall (28 or 30) of protective cover plate (12) can easily be bent or formed by a worker while on the job site to form the second cover plate (34). Therefore there is no need to provide or sell an additional second cover plate (34) as the protective cover plate (12) is easily modified if so needed. However, it may be useful and desirable to sell an instructional pamphlet so as to inform the user of their optional uses and/or proper use of the protective cover plate (12).

It can now be seen we have herein provided a novel protective cover plate which is used for temporarily covering a prior art electrical outlet box during the construction process. The plate may be made from any material of engineering choice and it is either disposable or reusable depending on the material it is made from. It is further economical to manufacture and ecologically friendly to dispose of Also, it is very functional, does not require any fasteners, or specialized installation tools, and it is easily adaptable for use with any type of electrical outlet box. Still further it includes means for the locating the cover plate after the walls have been constructed which is most useful.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

Having described our invention, what we claim as new and desire to secure by Letters Patent is:

1. A protective cover plate for temporarily covering an electrical outlet box comprising said electrical outlet box being constructed from four side panels and a rear panel which when interconnected form a housing having an internal compartment for containment of electrical components and an open front, said protective cover plate having two grooves that are separated by one ridge, one of said grooves providing a first upraised side wall, one of said grooves providing a second upraised side wall, said first upraised side wall being separated and opposed to said second upraised side wall, and said protective cover plate being of a shape and size to be frictionally removably engaged within said internal compartment with each said side wall and said at least one ridge having a flush relationship with said open front when said protective cover plate is installed within said internal compartment.

2. The protective cover plate of claim 1 wherein said one ridge functions as a finger grip for easily removing said protective cover plate from within said internal compartment of said electrical outlet box.

3. The protective cover plate of claim 1 further includes a magnet.

4. The protective cover plate of claim 1 wherein said protective cover plate is made from one of the following: metal, wood, plastic, rubber, cardboard or aluminum.

5. The protective cover plate of claim 1 further includes optional extension means for extending the width thereof comprising of: a second cover plate having one groove that is formed in between an upraised sidewall and one upraised ridge, said upraised ridge being shaped to form an L-shaped ledge, said upraised sidewall being separated and opposed to said L-shaped ledge, and said L-shaped ledge being of a shape and size to receive and mate with either said first upraised side wall or said second upraised sidewall, whereby:

said protective cover plate and said second cover plate when used in combination allow a worker to easily adjust the width of said protective cover plate so as to be adaptable for use with a prior art electrical outlet box which is of a size other than standard.

* * * * *